H. L. GALBRAITH.
DIRIGIBLE HEADLIGHT.
APPLICATION FILED JUNE 4, 1912.
1,058,421.
Patented Apr. 8, 1913.
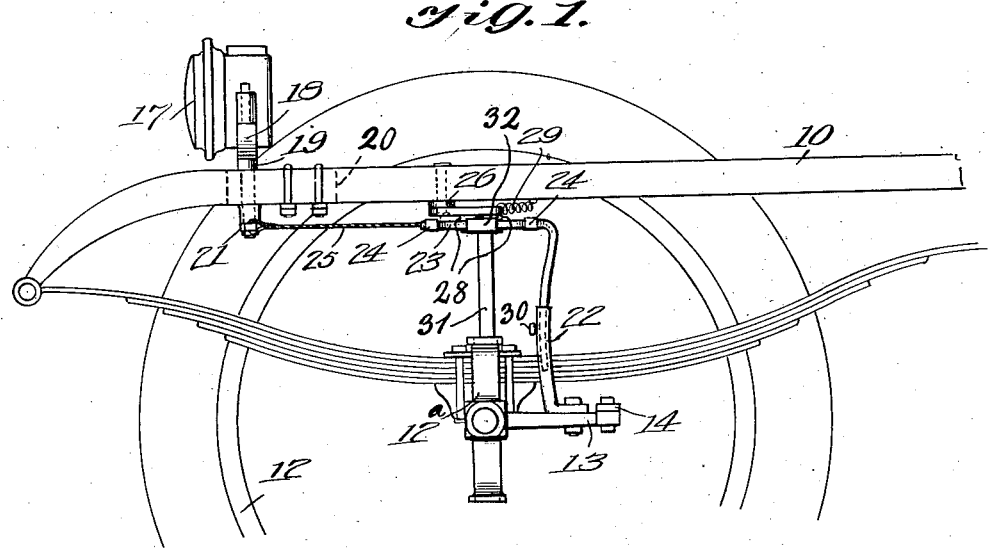
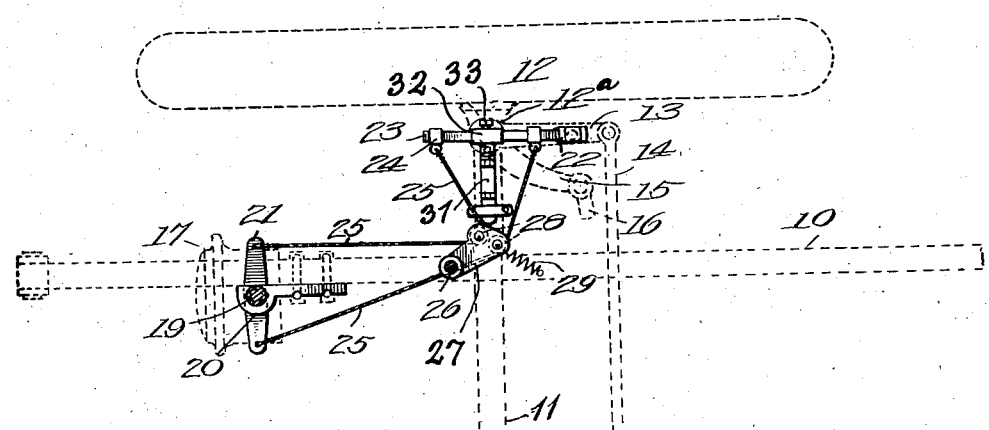
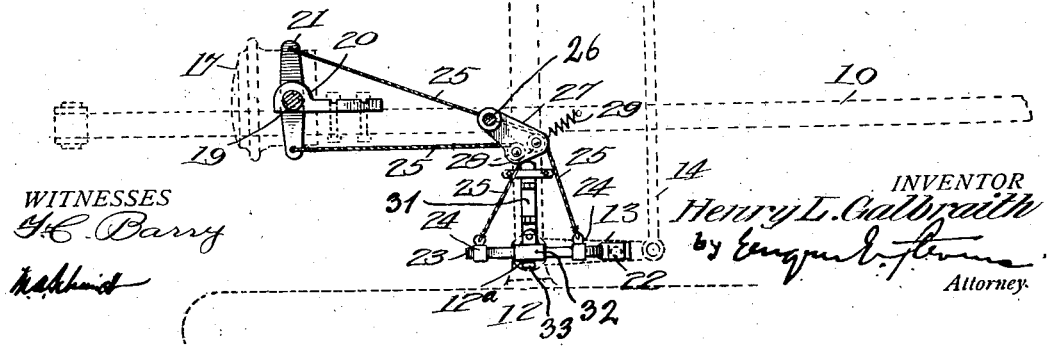
WITNESSES
INVENTOR
Henry L. Galbraith
by Eugene D. Stevens
Attorney.

UNITED STATES PATENT OFFICE.

HENRY L. GALBRAITH, OF BOZEMAN, MONTANA.

DIRIGIBLE HEADLIGHT.

1,058,421.  Specification of Letters Patent.  Patented Apr. 8, 1913.

Application filed June 4, 1912. Serial No. 701,495.

*To all whom it may concern:*

Be it known that I, HENRY L. GALBRAITH, a citizen of the United States, residing at Bozeman, in the county of Gallatin and State of Montana, have invented certain new and useful Improvements in Dirigible Headlights, of which the following is a specification.

This invention relates to that class of head-lights for automobiles and other vehicles, which are pivoted and connected to the steering mechanism of the vehicle, whereby the head-light will be automatically shifted with the steering wheels, so that when the vehicle is making a turn or traveling on a curve, the beam of light is made to follow the curve instead of being thrown to one side to follow the course of the vehicle body.

It is the object of the present invention to provide an operating connection of the kind stated which can be readily applied to the vehicle without altering or modifying the structure thereof, or that of the steering gear.

A further object of the invention is to provide a structure which is not affected by the rocking movement of the vehicle body, but which is efficient and reliable in operation.

The invention also has for its object to provide a mechanism for the purpose stated which is devoid of complicated parts to get out of order.

With these objects in view, the invention consists in a novel construction and arrangement of parts to be hereinafter described and claimed, reference being had to the accompanying drawings, in which—

Figure 1 is a side elevation of the front portion of an automobile showing the application of the invention. Fig. 2 is a plan view.

Referring specifically to the drawing, 10 denotes the side-bars of the chassis of an automobile, and 11 is the front axle to which the steering wheels 12 are connected by a knuckle-joint 12ª, as usual, said joint having the customary steering arms 13 which are connected by a reach rod 14. One of the knuckles has an arm 15 to which the steering rod 16 is connected. These parts are all constructed and arranged in the ordinary manner, and as nothing is claimed with respect thereto, a further description thereof is deemed unnecessary. Each lamp 17 is carried by a bracket 18 having a vertical stem 19 which is mounted for rotation in a bearing 20 carried by the side bar 10. The lower end of the stem depends from the bearing, and to said end is made fast a rocker arm 21 extending horizontally in opposite directions from the stem. To the steering arm 13 is bolted, or otherwise made fast, an upstanding bracket arm 22 terminating at its upper extremity in a horizontal portion 23 which is located above the knuckle-joint 12ª so as to cross a point which is in line with the axis of said joint and on a level with the bottom of the side bar 10. To the part 23 are fastened, by means of suitable clips 24, two wire cables or other suitable flexible connections 25, the connections being made on opposite sides of and equidistant from the aforesaid axis. On the bottom of the side bar 10 is pivoted at 26, to swing in a horizontal plane, a plate 27 carrying two guide-pulleys 28. One of the cables 25 extends from the part 23 to one of the guide-pulleys 28, and after passing around the same extends forward and is made fast to one end of the arm 21. The other cable extends from the part 23 to the other guide-pulley 28 and thence passes forward and is connected to the other end of the arm 21. On the side bar 10 is anchored a spring 29 which is connected to the plate 27 and serves to swing the same in a direction to hold the cables straight, and also to allow the free and accurate working of the lamp as the body of the car adjusts itself to the axle on rough roads. Both lamps are provided with the herein described operating means.

In operation, the movement of the steering arms 13 swings the parts 23 in a horizontal plane which motion is transmitted by the cables 25 to the lamps and the latter are swung around with the wheels 12 and the beams of light therefore follow the direction of the wheels.
The bracket arm 22 is in two telescoping sections as clearly shown in Fig. 1, said sections being locked by a set screw 30. This construction enables the bracket arm to be lengthened or shortened to suit the relative position of the steering arm 12 and the side bar 10. Between the part 22 and the axle 11 extends a brace 31 which is in several pivotal sections, and the section which is next to the part 23 is pivotally connected to a sleeve 32 carried by said part and locked by a set screw 33. The purpose of making the brace in hinged or pivotally connected sections is to allow the swing of the part 23 relative to the axle 11.

I claim:

1. The combination with a vehicle and its steering arm; of a bracket carried by the steering arm, a lamp having a rotatable supporting-stem, a rocker arm fixed to said stem, flexible connections between the aforesaid bracket and the respective ends of the rocker arm, guide-pulleys over which the connections pass, and a spring-controlled swinging support for the pulleys.

2. The combination with a vehicle, an axle, a steering wheel, a knuckle-joint connection between the axle and the steering wheel, and a steering arm extending from the knuckle-joint; of a bracket carried by said steering arm and having a horizontal arm located above the knuckle-joint and crossing a point which is in alinement with said axis, a lamp having a rotatable supporting-stem, a rocker-arm fixed to said stem, and flexible connections between the aforesaid horizontal arm on opposite sides of the knuckle-joint axis and the respective ends of the rocker-arm.

3. The combination with a vehicle, an axle, a steering wheel, a knuckle-joint connection between the axle and the steering wheel, and a steering arm extending from the knuckle-joint; of a bracket carried by said steering arm and having a horizontal arm located above the knuckle-joint and crossing a point which is in alinement with said axis, a lamp having a rotatable supporting-stem, a rocker-arm fixed to said stem, flexible connections between the aforesaid horizontal arm on opposite sides of the knuckle-joint axis and the respective ends of the rocker-arm, guide-pulleys over which the connections pass, and a spring-controlled swinging support for the pulleys.

4. The combination with a vehicle, an axle, a steering wheel, a knuckle-joint connection between the axle and the steering wheel, and a steering arm extending from the knuckle-joint; of a bracket carried by said steering arm and having a horizontal arm swinging with the steering arm and extending transversely of the knuckle-joint axis, a lamp having a rotatable supporting stem, a rocker-arm fixed to said stem, and flexible connections between the aforesaid horizontal arm and the respective ends of the rocker-arm.

5. The combination with a vehicle, an axle, a steering wheel, a knuckle-joint connection between the axle and the steering wheel, and a steering arm extending from the knuckle-joint; of a bracket carried by said steering arm and having a horizontal arm swinging with the steering arm and extending transversely of the knuckle-joint axis, a lamp having a rotatable supporting stem, a rocker-arm fixed to said stem, flexible connections between the aforesaid horizontal arm and the respective ends of the rocker-arm, guide-pulleys over which the connections pass and a spring-controlled swinging support for the pulleys.

In testimony whereof I affix my signature in presence of two witnesses.

HENRY L. GALBRAITH.

Witnesses:
A. D. BREWER,
GEO. H. DEMOREST.